US009319948B1

(12) United States Patent
Oroskar et al.

(10) Patent No.: US 9,319,948 B1
(45) Date of Patent: Apr. 19, 2016

(54) WIRELESS COMMUNICATION SYSTEM TO SELECT A WIRELESS ACCESS NODE BASED ON RADIO ACCESS TERMINAL MEASUREMENTS AND SUBSCRIBER WIRELESS DATA SCHEDULING WEIGHTS

(71) Applicant: Sprint Communications Company L.P., Overland Park, KS (US)

(72) Inventors: Siddharth Oroskar, Overland Park, KS (US); Jasinder Pal Singh, Olathe, KS (US); Suryanarayanan Ramamurthy, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/661,884

(22) Filed: Mar. 18, 2015

(51) Int. Cl.
*H04W 36/00* (2009.01)
*H04W 36/30* (2009.01)
*H04W 36/32* (2009.01)
*H04W 36/36* (2009.01)
*H04W 88/08* (2009.01)

(52) U.S. Cl.
CPC .......... *H04W 36/0088* (2013.01); *H04W 36/30* (2013.01); *H04W 36/32* (2013.01); *H04W 36/36* (2013.01); *H04W 88/08* (2013.01)

(58) Field of Classification Search
CPC . H04W 36/0088; H04W 36/36; H04W 36/32; H04W 36/30; H04W 88/08

USPC ......................................................... 455/437
See application file for complete search history.

(56) References Cited

U.S. PATENT DOCUMENTS

| 2011/0286427 | A1* | 11/2011 | Shirota | H04W 68/12 370/331 |
| --- | --- | --- | --- | --- |
| 2013/0329560 | A1 | 12/2013 | Shomura et al. | |
| 2013/0336153 | A1* | 12/2013 | Liang | H04W 24/10 370/252 |
| 2015/0296426 | A1* | 10/2015 | Mildh | H04W 36/0055 455/436 |

* cited by examiner

*Primary Examiner* — Juan A Torres

(57) ABSTRACT

An LTE wireless access node selects a wireless access node based on Radio Access Terminal (RAT) measurements and subscriber wireless data scheduling weights. The LTE wireless access node includes a communication interface to transfer communications for a subscriber operating a UE. The communication interface of the LTE wireless node receives RAT measurements indicating individual RF signal quality for multiple eNodeBs from the UE. The communication interface of the LTE wireless access node receives subscriber wireless data scheduling weights indicating scheduling metrics for the subscriber operating the UE from the multiple eNodeBs. The LTE wireless access node also includes a processing system to process the RAT measurements and subscriber wireless data scheduling weights to select one of the eNodeBs. The communication interface of the LTE wireless access system further transfers a signaling message to the UE indicating the selected eNodeB.

20 Claims, 7 Drawing Sheets

| DEVICE | RAT MEASUREMENTS | | | | SUBSCRIBER WEIGHTS | | | |
|---|---|---|---|---|---|---|---|---|
| | E NODE B 421 | E NODE B 422 | E NODE B 423 | E NODE B 424 | E NODE B 421 | E NODE B 422 | E NODE B 423 | E NODE B 424 |
| UE 401 | RF 1A | RF 2A | RF 3A | RF 4A | 1 | .5 | .7 | .9 |
| UE 402 | RF 1B | RF 2B | RF 3B | RF 4B | .8 | .3 | 1 | .6 |

WIRELESS COMMUNICATION SYSTEM TO SELECT A WIRELESS ACCESS NODE BASED ON RADIO ACCESS TERMINAL MEASUREMENTS AND SUBSCRIBER WIRELESS DATA SCHEDULING WEIGHTS

TECHNICAL BACKGROUND

Wireless communications have become increasingly prominent for sending and receiving information. For example, individuals may utilize a wireless communication device for voice communications, video calls, text messaging, email, research, entertainment, and/or for conducting critical business transactions. Wireless communication devices may use wireless protocols, such as Long Term Evolution (LTE), Evolution Data Optimized (EVDO), Code Division Multiple Access (CDMA), Global System for Mobile communications (GSM), High Speed Packet Access (HSPA), and the like to communicate over wireless communication networks.

Wireless communication networks comprise a collection of wireless access nodes connected together with communication links. A wireless communication network may also be connected to other communication networks. Wireless communication systems, such as cellular voice and data networks, typically include multiple wireless access nodes spread over a geographic area through which wireless communication devices can register and receive wireless access to wireless communication services. Each wireless access node broadcasts its signal over one or more sectors.

Mobile devices, such as wireless communication devices, may change location. As the wireless communication devices change location, they may need to register with and receive wireless access to wireless communication services from different wireless access nodes. The wireless communication devices may select the wireless access points with the strongest or best signal strength. However, there may be other factors to consider when selecting a wireless access point for a handover or handoff.

OVERVIEW

Examples disclosed herein provide a system, method, hardware, and software to select a wireless access node based on Radio Access Terminal (RAT) measurements and subscriber wireless data scheduling weights. In one instance, the method includes a Long Term Evolution (LTE) wireless access node transferring communications for a subscriber operating a User Equipment (UE). The LTE wireless node receives RAT measurements that indicate Radio Frequency (RF) quality for multiple eNodeBs from a UE. The method further includes the LTE wireless access node receiving subscriber wireless data scheduling weights indicating scheduling metrics for the subscriber operating the UE from multiple eNodeBs. The method also includes the LTE wireless access node processing the RAT measurements and the subscriber wireless data scheduling weights to select one of the multiple eNodeBs. The method includes the LTE wireless access node transferring a signaling message to the UE indicating the selected eNodeB.

In another example, an LTE wireless access node selects a wireless access node based on Radio Access Terminal (RAT) measurements and subscriber wireless data scheduling weights. The LTE wireless access node includes a communication interface to transfer communications for a subscriber operating a UE. The communication interface of the LTE wireless node also receives RAT measurements indicating RF signal quality for multiple eNodeBs from the UE. The communication interface of the LTE wireless access node further receives subscriber wireless data scheduling weights indicating scheduling metrics for the subscriber operating the UE from the multiple eNodeBs. The LTE wireless access node also includes a processing system to process the RAT measurements and subscriber wireless data scheduling weights to select one of the multiple eNodeBs. The communication interface of the LTE wireless access system further transfers a signaling message to the UE indicating the selected eNodeB.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 5 illustrates a data structure used to select a wireless access node based RAT measurements and subscriber wireless data scheduling weights.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
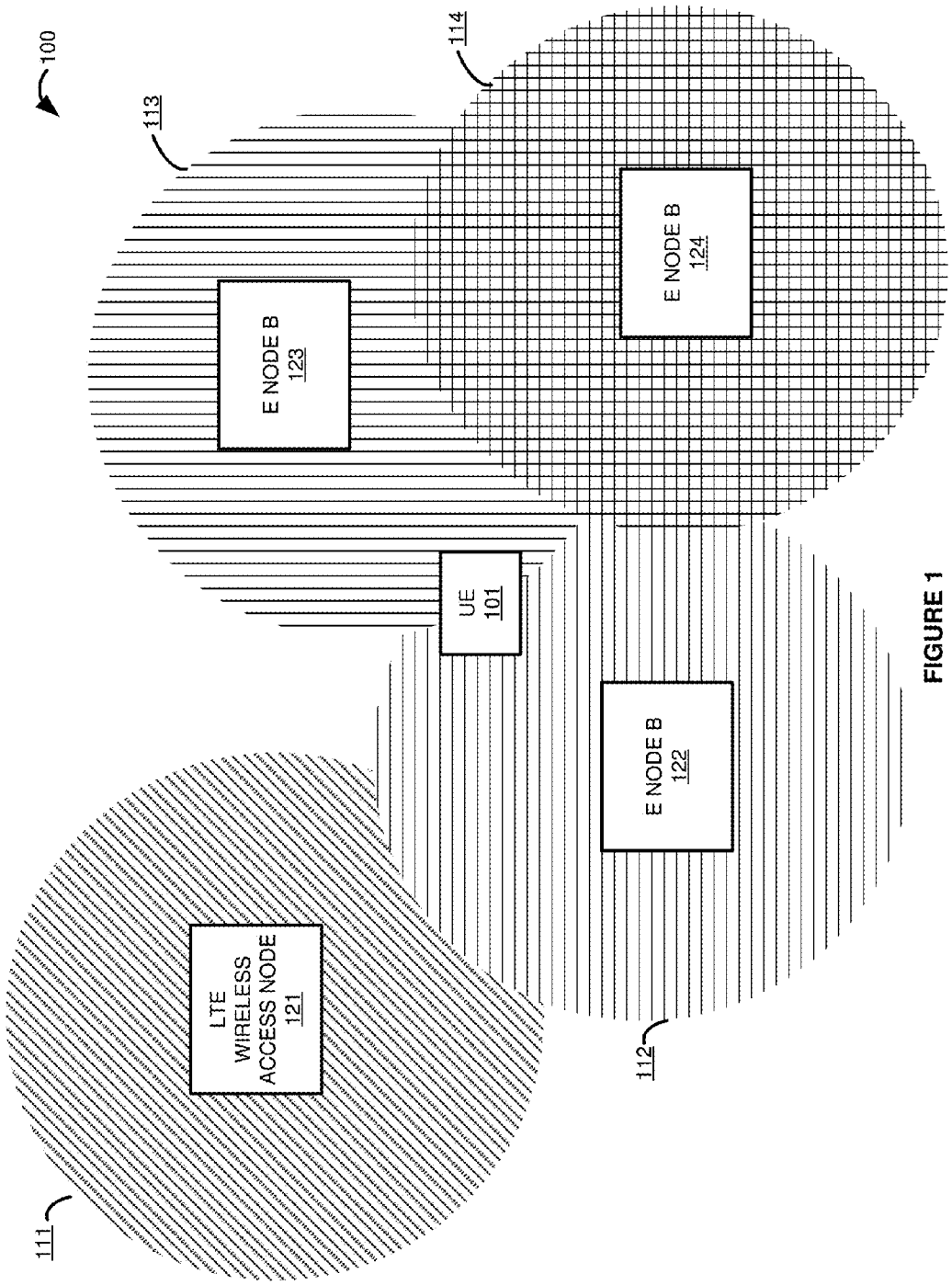
FIG. 1 illustrates a wireless communication system to select a wireless access node based on Radio Access Terminal (RAT) measurements and subscriber wireless data scheduling weights.

FIG. 1 illustrates wireless communication system 100 to select a wireless access node based RAT measurements and subscriber wireless data scheduling weights. Wireless communication system 100 includes User Equipment (UE) 101, LTE wireless access node 121, eNodeBs 122-124, and wireless coverage areas or cell sectors 111-114. The wireless coverage areas 111-114 may overlap, as shown. In other examples, wireless coverage areas 111-114 may not overlap. In yet other examples, wireless coverage areas 111-114 may be separated by other wireless coverage areas or by areas with no wireless coverage.

Although not required, UE 101 communicates with LTE wireless access node 121 and eNodeBs 122-124 using a wireless protocol such as Long Term Evolution (LTE). In some example, UE 101 may connected to a base station or other wireless access point using wireless protocols such as Evolution Data Optimized (EVDO), Code Division Multiple Access (CDMA), Global System for Mobile communications (GSM), High Speed Packet Access (HSPA), Wireless Fidelity (WIFI), Worldwide Interoperability for Microwave Access (WiMAX), and the like—including combinations thereof. The wireless communication links are not shown for clarity.

LTE wireless access node 121 provides wireless access to wireless communication services in wireless coverage area or wireless sector 111. ENodeB 122 provides wireless access to wireless communication services in wireless coverage area or wireless sector 112. ENodeB 123 provides wireless access to wireless communication services in wireless coverage area or wireless sector 113. ENodeB 124 provides wireless access to wireless communication services in wireless coverage area or wireless sector 114.

Examples of LTE wireless access node 121 include base stations, base stations transceivers, femtocell base stations, eNodeBs, WIFI hotspots, wireless access points, and/or other wireless access nodes—including combinations thereof. Examples of UE 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

In operation, LTE wireless access node 121 transfers communications for a subscriber operating UE 101. In some examples, UE changes location and needs to handoff to one of eNodeBs 122-124. In other examples, LTE wireless access node 121 may become overloaded triggering a handoff or handover to one of eNodeBs 122-124.

LTE wireless node 121 receives RAT measurements that indicate the individual Radio Frequency (RF) quality for eNodeBs 122-124 from UE 101. Examples of RAT measurements include Received Signal Strength Indication (RSSI), Signal to Noise Ratio (SNR), interference, received signal power, Received Signal Reference Power (RSRP), Common Pilot Channel (CPICH), bit error rate (BER) and block error/erasure rate (BLER), received quality of speech (RxQual), distance between the phone and the access point (may be estimated from the radio signal propagation delay, Global Positioning Satellites (GPS), or other location determination methods), and/or other quality or performance measurements—including combinations thereof. RAT measurements may also indicate wireless access point load, packet loss, delay, jitter, and/or other information—including combinations thereof. Although not required, eNodeBs 122-124 may be included in an active list, neighbor list, or candidate list.

LTE wireless access node 121 receives subscriber wireless data scheduling weights indicating scheduling metrics for the subscriber from eNodeBs 122-124. In some examples, the subscriber wireless data scheduling weights indicates a subscriber's prioritized access to communication resources relative to other subscribers (i.e. a scheduling QoS). For instance, a subscriber may be assigned a percentage of the communication resources (75%), "units" or blocks of communication resources, a class of service (i.e. silver, gold, platinum), user order (1-10), and/or the like—including combinations thereof. Although not required, the subscriber wireless data scheduling weights may be applied through a Class of Identifier (QCI). Subscriber wireless data scheduling weights may also indicate billing information, payment information, wireless plan information, device type, and/or other subscriber information—including combinations thereof.

LTE wireless access node 121 processes the RAT measurements and the subscriber wireless data scheduling weights to select one of eNodeBs 122-124. LTE wireless access node 121 transfers a signaling message to UE 101 indicating the selected eNodeB. In some examples, UE 101 may receive the subscriber wireless data scheduling weights from eNodeBs 122-124 and transfer for delivery with the RAT measurements. In other examples, UE 101 may receive the subscriber wireless data scheduling weights from eNodeBs 122-124 and process the RAT measurements and subscribers weights to select one of eNodeBs 122-124.

Figure 2:
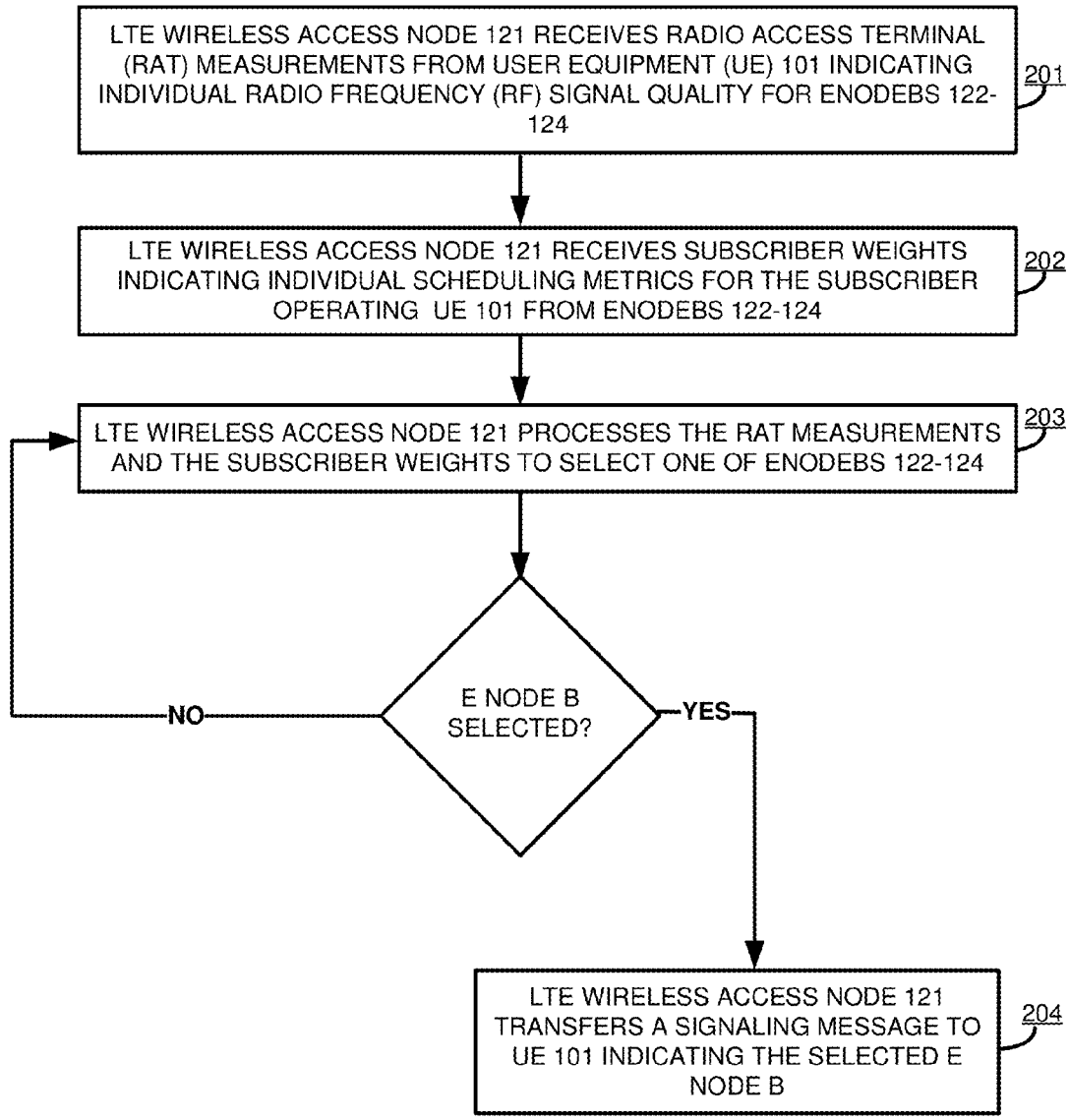
FIG. 2 illustrates the operation of the wireless communication system to select a wireless access node based RAT measurements and subscriber wireless data scheduling weights.

FIG. 2 illustrates the operation of wireless communication system 100 to select a wireless access node based RAT measurements and subscriber wireless data scheduling weights. UE 101 is connected to LTE wireless access point 121. As UE 101 moves through wireless communication system 100, UE 101 may need to handoff or handover to another wireless access point (i.e. eNodeBs 122-124). In other examples, the handoff or handover may be initiated because LTE wireless access node 121 is heavily loaded or disabled.

LTE wireless node 121 receives RAT measurements from UE 101 that indicate the individual Radio Frequency (RF) quality for eNodeBs 122-124 (201). For example, UE 101 may respond to an RRC handover command from LTE wireless access node 121 with a response and the RAT measurements. LTE wireless access node 121 receives subscriber wireless data scheduling weights indicating individual scheduling metrics for the subscriber operating UE 101 from eNodeBs 122-124 (202). For example, the subscriber wireless data scheduling weights may be transferred from eNodeBs 122-124 to LTE wireless access node 121 over the LTE X2 links.

LTE wireless access node 121 processes the RAT measurements and the subscriber wireless data scheduling weights to select one of eNodeBs 122-124 (203). For example, eNodeB 122 may have better RF quality or signal strength, but the subscriber wireless data scheduling weight received from eNodeB 122 may be lower than the subscriber wireless data scheduling weights received from eNodeBs 123 and 124. Therefore, eNodeB 123 or 124 may be selected for the handoff rather than eNodeB 122, even though eNodeB 122 has a better signal strength. In another example, LTE wireless access node 121 may process the RAT measurements and subscriber wireless data scheduling weights to generate an eNodeB score for eNodeBs 122-124 and select the eNodeB with the best or highest score. LTE wireless access node 121 transfers a signaling message to UE 101 indicating the selected eNodeB (204). For example, a Mobile Management Entity (MME) transfers an sl-ap handover command to eNodeB 121 and eNodeB 121 sends an RRC handover command to UE 101

Figure 3:
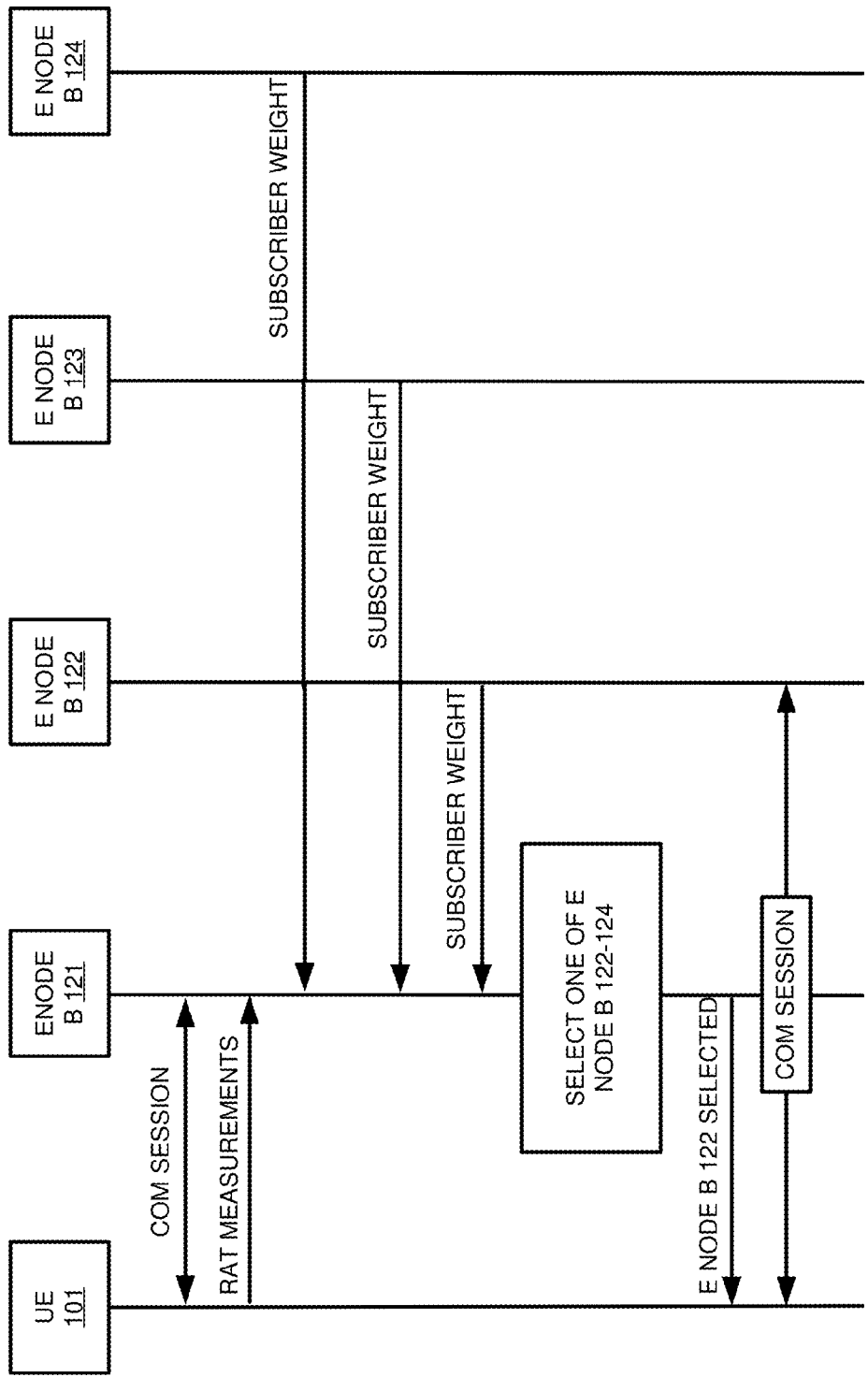
FIG. 3 illustrates the operation of the wireless communication system to select a wireless access node based RAT measurements and subscriber wireless data scheduling weights.

FIG. 3 illustrates the operation of wireless communication system 100 to select a wireless access node based RAT measurements and subscriber wireless data scheduling weights.

Although not required, UE 101 may be in an active communication session with LTE wireless access node 121. Examples of communication sessions include, voice calls, video calls, data sessions, media streaming, text messaging, and/or other communication sessions—including combinations thereof. In some examples, UE 101 is not in an active communication session. In this example, LTE wireless access node 121 is an eNodeB and is referred to as eNodeB 121. Although, LTE wireless access node 121 could also be a base station, WIFI hotspot, or other wireless access point.

ENodeB 121 transfers communications for a subscriber operating UE 101. ENodeB 121 receives individual RAT measurements that indicate the individual Radio Frequency (RF) quality for eNodeBs 122-124 from UE 101. ENodeB 121 receives individual subscriber wireless data scheduling weights indicating scheduling metrics for the subscriber operating UE 101 from eNodeBs 122-124. ENodeB 121 processes the RAT measurements and the subscriber wireless data scheduling weights to select one of eNodeBs 122-124. ENodeB 121 transfers a signaling message to UE 101 indicating the selected eNodeB. In this example, the selected eNodeB is eNodeB 122 and a handoff is performed from eNodeB 121 to eNodeB 122. UE 101 continues the communication session with eNodeB 122.

Figure 4:
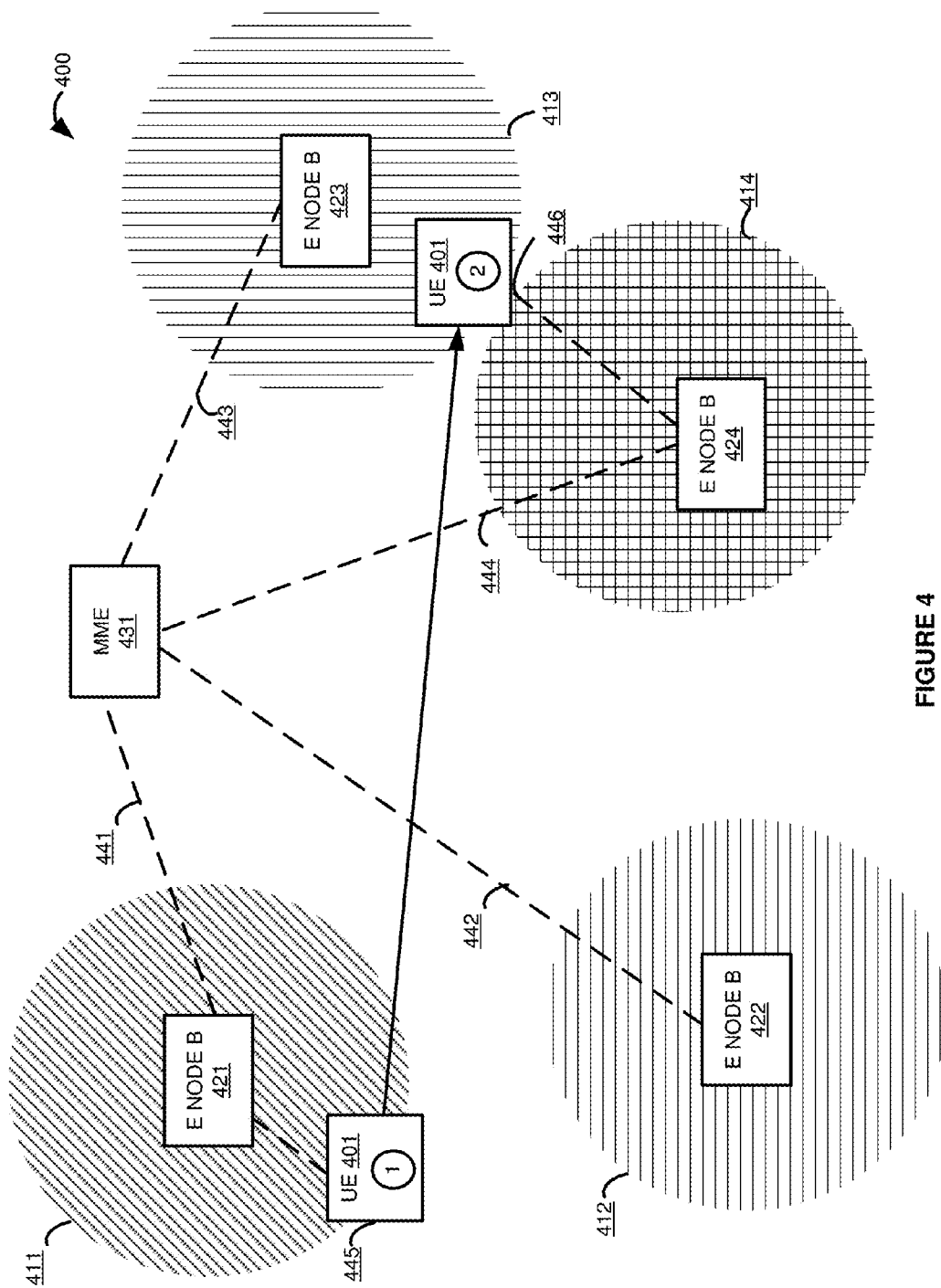
FIG. 4 illustrates a wireless communication system to select a wireless access node based RAT measurements and subscriber wireless data scheduling weights.

FIG. 4 illustrates wireless communication system 400 to select an eNodeB based RAT measurements and subscriber wireless data scheduling weights. Wireless communication system 400 includes User Equipment (UE) 401, eNodeBs 421-424, wireless coverage areas or cell sectors 411-414, MME 431, and communication links 441-446. Other elements of wireless communication system 400 have been omitted for clarity.

ENodeB 421 communicates with MME 431 over communication link 441. ENodeB 422 communicates with MME 431 over communication link 442. ENodeB 423 communicates with MME 431 over communication link 443. ENodeB 424 communicates with MME 431 over communication link 444. At position one, UE 401 communicates with eNodeB 421 over wireless communication link 445. At position two, UE 401 communicates with eNodeB 424 over wireless communication link 446.

Communication links 441-444 use metal, glass, air, space, or some other material as the transport media. Communication links 441-444 could use various communication protocols, such as Time Division Multiplex (TDM), Internet Protocol (IP), Ethernet, communication signaling, LTE, WIFI, and/or some other communication format—including combinations thereof. Communication links 441-444 could be direct links or may include intermediate networks, systems, or devices. Wireless communication links 445-446 use the air or space as the transport media. Wireless communication links 445-446 may use various protocols, such as LTE, WIFI, and/or some other wireless communication format.

ENodeB 421 provides wireless access to wireless communication services in wireless coverage area or wireless sector 411. ENodeB 422 provides wireless access to wireless communication services in wireless coverage area or wireless sector 412. ENodeB 423 provides wireless access to wireless communication services in wireless coverage area or wireless sector 413. ENodeB 424 provides wireless access to wireless communication services in wireless coverage area or wireless sector 414.

FIG. 5 illustrates data structure 500 used to select eNodeB 424 in FIG. 4. Data structure 500 includes a first column indicating a device or UE, a second column indicating the RAT measurements, and a third column indicating the subscriber wireless data scheduling weights. The RAT measurements and subscriber wireless data scheduling weights columns are further separated by eNodeB. Data structure 500 is just an example and data structure 500 may include other information not shown. The RAT measurements for eNodeB 421 is RF 1A, the RAT measurements for eNodeB 422 is RF 2A, the RAT measurements for eNodeB 423 is RF 3A, the RAT measurements for eNodeB 424 is RF 4A. The subscriber wireless data scheduling weight for UE 401 from eNodeB 421 is 0.3, the subscriber wireless data scheduling weight for UE 401 from eNodeB 422 is 0.5, the subscriber wireless data scheduling weight for UE 401 from eNodeB 423 is 0.7, and the subscriber wireless data scheduling weight for UE 401 from eNodeB 424 is 0.9. The values used in FIG. 5 are for illustrative purposes and do not reflect actual values.

In operation, at position 1, UE 401 wirelessly exchanges communications with eNodeB 421. UE 401 changes location to position 2 and needs to handoff or handover to one of eNodeBs 422-424. ENodeB 421 receives RAT measurements that indicate the individual Radio Frequency (RF) quality for eNodeBs 422-424 from UE 401. ENodeB 421 receives subscriber wireless data scheduling weights indicating scheduling metrics for the subscriber operating UE 401 from eNodeBs 422-424.

ENodeB 421 processes the RAT measurements and the subscriber wireless data scheduling weights to select one of eNodeBs 422-424. In this example, UE 401 is closer to eNodeB 423, so the signal strength received from eNodeB 423 may be stronger than the signal strength of eNodeB 424, but UE 401 performs a handoff to eNodeB 424 rather than eNodeB 423 due to the higher subscriber wireless data scheduling weight. The higher subscriber wireless data scheduling weight indicates that UE 401 will receive better scheduling on eNodeB 424 compared to eNodeB 423 and the signal strength is sufficient. ENodeB 421 transfers a signaling message to UE 401 indicating selected eNodeB 424. In other examples, the eNodeB B with the best RF quality is selected.

In another example, eNodeB 424 may reject the handoff and UE 401 may repeat the process to select another eNodeB for handoff. Although not required, eNodeB 421 may spot outliers or other discrepancies in the received subscriber wireless data scheduling weights and report the outliers to the LTE core network. For example, the subscriber wireless data scheduling weights for UE 401 may all range between 1 and 0.7, but on one eNodeB, the subscriber wireless data scheduling weight for UE 401 is 0.1, which is much lower than the other eNodeBs. The lower subscriber wireless data scheduling weight is reported to the core network for further action.

Figure 6:
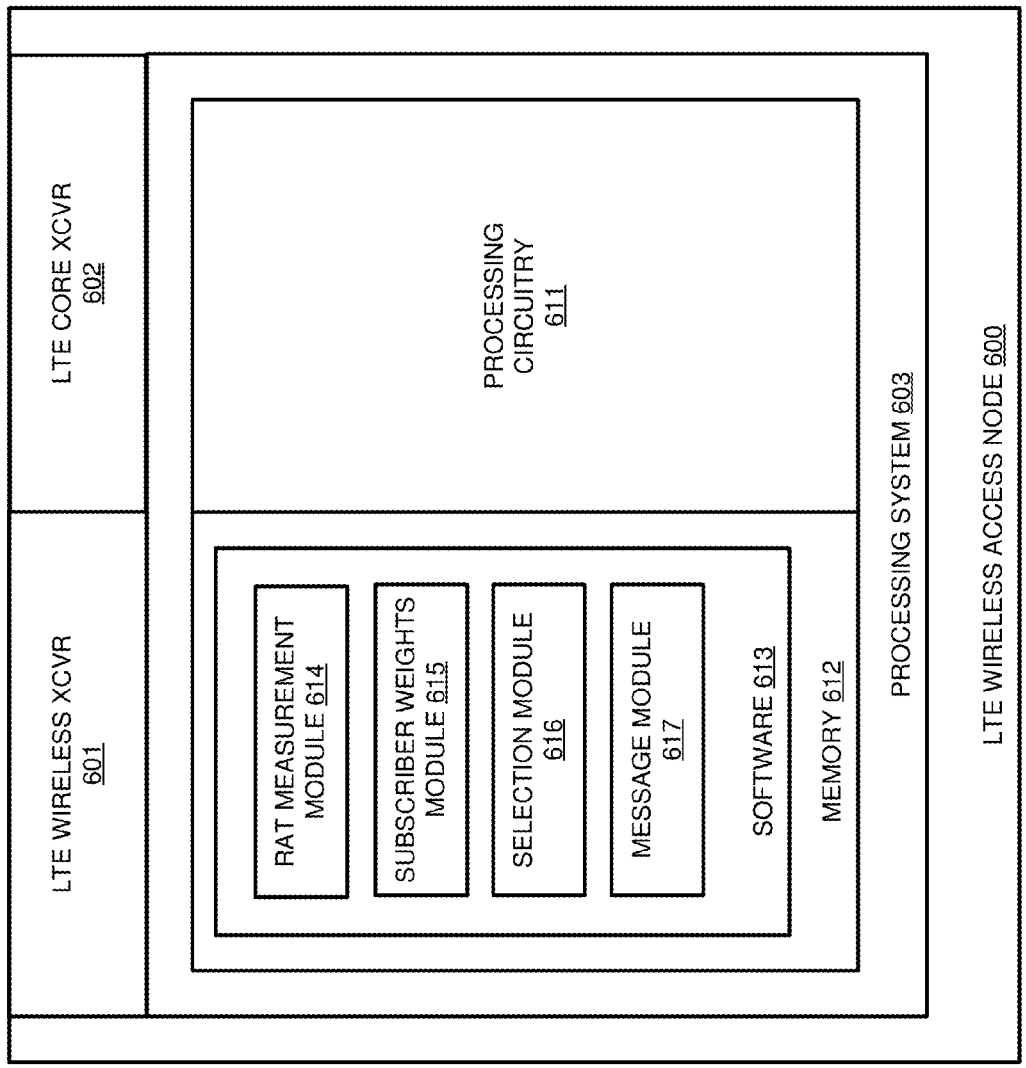
FIG. 6 illustrates an example of a LTE wireless access node to select a wireless access node based RAT measurements and subscriber wireless data scheduling weights.

FIG. 6 illustrates LTE wireless access node 600 to select an eNodeB based RAT measurements and subscriber wireless data scheduling weights. LTE wireless access node 600 is an example of LTE wireless access node/eNodeB 121 and eNodeB 421, although systems 121 and 421 may use alternative configurations.

LTE wireless access node 600 comprises LTE wireless transceiver 601, LTE core transceiver 602, and processing system 603. Processing system 603 comprises processing circuitry 611 and memory 612 that stores software 613. Processing system 603 is linked to transceiver 601. LTE wireless access node 600 may include other well-known components that are not shown for clarity, such as routers, servers, computer systems, databases, and power systems.

LTE wireless transceiver 601 includes comprises RF communication circuitry and an antenna. The RF communication circuitry typically includes an amplifier, filter, RF modulator, and signal processing circuitry. LTE wireless transceiver 601 may also include a memory device, software, processing circuitry, or some other communication device. LTE wireless transceiver 601 exchanges signaling and other control data with wireless access nodes as described herein. LTE core transceiver 602 comprises a physical communication port, signal processing circuitry, software, and/or some other communication components. LTE core transceiver 602 may use various protocols, such as IP, TDM, Ethernet, wireless, or some other network communication format—including combinations thereof. LTE core transceiver 602 exchanges signaling and other control data with the LTE core network as described herein.

Processing circuitry 611 comprises microprocessor and other circuitry that retrieves and executes operating software 613 from memory system 612. Memory 612 comprises a non-transitory computer-readable storage medium, such as a disk drive, flash drive, data storage circuitry, or some other memory apparatus. Memory 612 could be a single device or be distributed across multiple devices. Processing circuitry 611 is typically mounted on one or more circuit boards that may also hold memory 612 and portions of communication transceivers 601-602.

Software 613 comprises computer programs, firmware, or some other form of computer-readable processing instructions. Software 613 may include an operating system, utilities, drivers, network interfaces, applications, or some other type of software. When executed by processing circuitry 611, software 613 directs processing system 603 to operate LTE wireless access node 600 as described herein. In particular, RAT module 614 directs processing system 603 to receive RAT measurements. Subscriber wireless data scheduling weights module 615 directs processing system 603 to receive the subscriber wireless data scheduling weights. Selection module 616 directs processing system 603 to process the RAT measurements and subscriber wireless data scheduling weights to select an eNodeB. Message module 617 directs processing system 603 to transfer a signaling message indicating the selected eNodeB to the UE.

Figure 7:
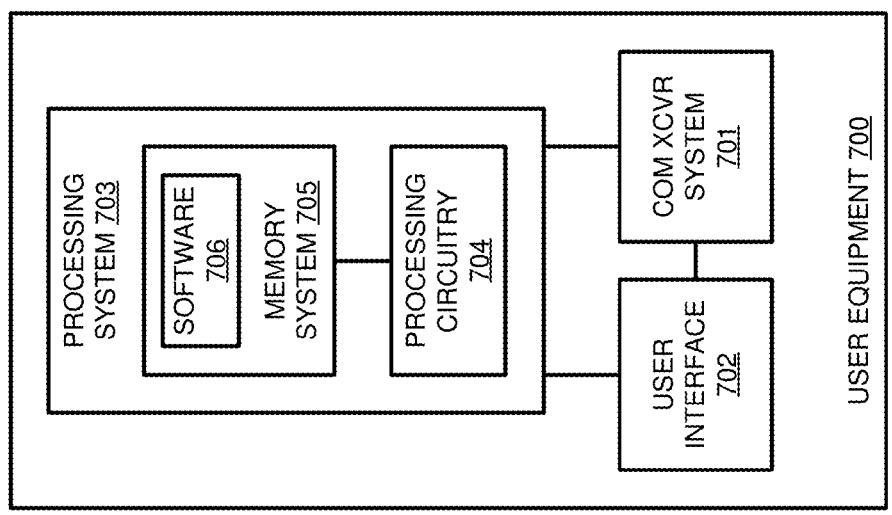
FIG. 7 illustrates an example of a wireless communication device to select a wireless access node based RAT measurements and subscriber wireless data scheduling weights.

FIG. 7 illustrates an example of UE 700 to select an eNodeB based RAT measurements and subscriber wireless data scheduling weights. UE 700 is an example of UE 101 and UE 401, although UE 101 and UE 401 could use alternative configurations. UE 700 comprises wireless communication transceiver system 701, user interface 702, and processing system 703. Processing system 703 is linked to communication transceiver system 701 and user interface 702. Processing system 703 includes processing circuitry 704 and memory system 705 that stores software 706.

UE 700 may include other well-known components such as a battery and an enclosure that are not shown for clarity. UE 700 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 701 comprises RF communication circuitry and an antenna. The RF communication circuitry typically includes an amplifier, filter, RF modulator, and signal processing circuitry. Wireless communication transceiver system 701 may also include a memory device, software, processing circuitry, or some other communication device. Wireless communication transceiver system 701 may use various communication formats, such as CDMA, EVDO, WIMAX, GSM, LTE, WIFI, HSPA, or some other wireless communication format—including combinations thereof.

User interface 702 comprises components that interact with a user to receive user inputs and to present media and/or information. User interface 702 may include a speaker, microphone, keyboard, camera, buttons, lights, display screen, touch screen, touch pad, scroll wheel, communication port, or some other user input/output apparatus—including combinations thereof. User interface 702 may be omitted in some examples.

Processing circuitry 704 comprises microprocessor and other circuitry that retrieves and executes operating software 706 from memory 705. Memory 705 comprises a non-transitory storage medium, such as a disk drive, flash drive, data storage circuitry, or some other memory apparatus. Processing circuitry 704 is typically mounted on a circuit board that may also hold memory 705, portions of wireless communication transceiver system 701, and user interface 702. Software 706 comprises computer programs, firmware, or some other form of machine-readable processing instructions. Software 706 may include an operating system, utilities, drivers, network interfaces, applications, or some other type of software.

Referring back to FIG. 1, UE 101 comprises Radio Frequency (RF) communication circuitry and an antenna. The RF communication circuitry typically includes an amplifier, filter, modulator, and signal processing circuitry. UE 101 may also include a user interface, memory device, software, processing circuitry, or some other communication components. UE 101 may be a telephone, computer, e-book, mobile Internet appliance, wireless network interface card, media player, game console, or some other wireless communication apparatus—including combinations thereof.

LTE wireless access node 121 and eNodeBs 122-124 comprise RF communication circuitry and an antenna. The RF communication circuitry typically includes an amplifier, filter, RF modulator, and signal processing circuitry. LTE wireless access node 121 and eNodeBs 122-124 may also include a router, server, memory device, software, processing circuitry, cabling, power supply, network communication interface, structural support, or some other communication apparatus. LTE wireless access node 121 could be a base station, Internet access node, telephony service node, wireless data access point, eNodeB, or some other wireless communication system—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) wireless access node to transfer communications for a subscriber, the method comprising:
    receiving Radio Access Terminal (RAT) measurements from a User Equipment (UE) operated by the subscriber indicating individual Radio Frequency (RF) signal quality for multiple eNodeBs;
    receiving subscriber wireless data scheduling weights indicating individual scheduling metrics for the subscriber from the multiple eNodeBs;
    processing the RAT measurements and the subscriber wireless data scheduling weights to select one of the multiple eNodeBs; and
    transferring a signaling message to the UE indicating the selected eNodeB.

2. The method of claim 1 wherein the LTE wireless access node comprises an eNodeB.

3. The method of claim 1 wherein selecting of one the LTE wireless access node based on the RAT measurements and the subscriber wireless data scheduling weights comprises selecting the LTE wireless access node having a best subscriber wireless data scheduling weight and a sufficient RF signal quality.

4. The method of claim 1 wherein selecting the LTE wireless access node based on the RAT measurements and the subscriber wireless data scheduling weights comprises selecting the LTE wireless access node having a best a RF signal quality and sufficient subscriber wireless data scheduling weight.

5. The method of claim 1 wherein selecting the LTE wireless access node based on the RAT measurements and the subscriber wireless data scheduling weights comprises:
  normalizing and combining the RAT measurements and the subscriber wireless data scheduling weights into an LTE wireless access node score; and
  selecting the LTE wireless access node with the best LTE wireless access node score.

6. The method of claim 1 wherein receiving subscriber wireless data scheduling weights indicating scheduling metrics for the subscriber comprises transferring requests for the scheduling metrics from the LTE wireless access node over LTE X2 interfaces to the multiple eNodeBs.

7. The method of claim 1 wherein receiving subscriber wireless data scheduling weights indicating scheduling metrics for the subscriber comprises receiving the scheduling metrics into the LTE wireless access node from the multiple eNodeBs over LTE X2 interfaces.

8. The method of claim 1 wherein receiving subscriber wireless data scheduling weights indicating scheduling metrics for the subscriber comprises transferring requests for the scheduling metrics from the LTE wireless access node over LTE X2 interfaces to the multiple eNodeBs in response to a loss of signal quality for the UE on the LTE wireless access node.

9. The method of claim 1 wherein receiving subscriber wireless data scheduling weights indicating scheduling metrics for the subscriber comprises transferring requests for the scheduling metrics from the LTE wireless access node over LTE X2 interfaces to the multiple eNodeBs in response to a request for the RAT measurements from the UE.

10. The method of claim 1 wherein receiving RAT measurements and receiving subscriber wireless data scheduling weights comprises requesting the RAT measurements while simultaneously requesting the scheduling metrics from the multiple eNodeBs.

11. A Long Term Evolution (LTE) wireless access node to transfer communications for a subscriber, the LTE wireless access node comprising:
  a communication interface configured to receive Radio Access Terminal (RAT) measurements from a User Equipment (UE) operated by the subscriber indicating individual Radio Frequency (RF) signal quality for multiple eNodeBs;
  the communication interface configured to receive subscriber wireless data scheduling weights indicating individual scheduling metrics for the subscriber from the multiple eNodeBs;
  a processing system configured to process the RAT measurements and the subscriber wireless data scheduling weights to select one of the multiple eNodeBs; and
  the communication interface configured to transfer a signaling message to the UE indicating the selected eNodeB.

12. The LTE wireless access node of claim 11 wherein the LTE wireless access node comprises an eNodeB.

13. The LTE wireless access node of claim 11 wherein the processing system is configured to select the eNodeB having a best subscriber wireless data scheduling weight and a sufficient RF signal quality.

14. The LTE wireless access node of claim 11 wherein the processing system is configured to select the eNodeB having a best a RF signal quality and sufficient subscriber wireless data scheduling weight.

15. The LTE wireless access node of claim 11 further comprising:
  the processing system configured to normalize and combine the RAT measurements and the subscriber wireless data scheduling weights into an eNodeB score; and
  the processing system configured to select the eNodeB with the best eNodeB score.

16. The LTE wireless access node of claim 11 further comprising:
  the processing system configured to transfer requests for the scheduling metrics from the LTE wireless access node over LTE X2 interfaces to the multiple eNodeBs.

17. The LTE wireless access node of claim 11 further comprising:
  the processing system configured to receive the scheduling metrics into the LTE wireless access node from the multiple eNodeB over LTE X2 interfaces.

18. The LTE wireless access node of claim 11 further comprising:
  the processing system configured to transfer requests for the scheduling metrics from the LTE wireless access node over LTE X2 interfaces to the multiple eNodeBs in response to a loss of signal quality for the UE on the LTE wireless access node.

19. The LTE wireless access node of claim 11 further comprising:
  the processing system configured to transfer requests for the scheduling metrics from the LTE wireless access node over LTE X2 interfaces to the multiple eNodeBs in response to a request for the RAT measurements from the UE.

20. The LTE wireless access node of claim 11 further comprising:
  the processing system configured to request the RAT measurements while simultaneously requesting the scheduling metrics from the multiple eNodeBs.

* * * * *